(12) United States Patent
Stevens et al.

(10) Patent No.: US 7,599,989 B2
(45) Date of Patent: Oct. 6, 2009

(54) SYSTEM AND METHOD FOR GATHERING AND REPORTING SCREEN RESOLUTIONS OF ATTENDEES OF A COLLABORATION SESSION

(75) Inventors: Jeremy Max Stevens, Seattle, WA (US); Kanchan Mitra, Woodinville, WA (US); Mihai Iuga, Redmond, WA (US); Sergei Osobov, Redmond, WA (US); Kenneth Wickes, Seattle, WA (US); Kyle Krum, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1058 days.

(21) Appl. No.: 11/042,320

(22) Filed: Jan. 24, 2005

(65) Prior Publication Data

US 2006/0168532 A1    Jul. 27, 2006

(51) Int. Cl.
*G06F 15/16* (2006.01)
(52) U.S. Cl. .................................... 709/204; 715/753
(58) Field of Classification Search ................. 709/203, 709/204, 206; 715/753, 751, 752; 370/260
See application file for complete search history.

(56) References Cited

U.S. PATENT DOCUMENTS

| 5,583,565 A | 12/1996 | Cortjens et al. |
| 5,596,346 A | 1/1997 | Leone et al. |
| 7,197,751 B2* | 3/2007 | Fedotov et al. ............... 719/323 |
| 2003/0009574 A1* | 1/2003 | Bodin et al. ................. 709/231 |
| 2005/0055306 A1* | 3/2005 | Miller et al. ................... 705/37 |
| 2005/0089213 A1* | 4/2005 | Geng ........................... 382/154 |
| 2006/0167997 A1* | 7/2006 | Forstadius ................... 709/204 |
| 2007/0073722 A1* | 3/2007 | Ramer et al. .................. 707/10 |
| 2007/0156813 A1* | 7/2007 | Galvez et al. ............... 709/204 |
| 2007/0214423 A1* | 9/2007 | Teplov et al. ................ 715/751 |
| 2008/0043691 A1* | 2/2008 | Chow et al. .................. 370/338 |
| 2008/0062893 A1* | 3/2008 | Bloebaum et al. ........... 370/260 |

FOREIGN PATENT DOCUMENTS

| WO | WO 02/097584 A2 | 12/2002 |
| WO | WO 2004/100500 A2 | 11/2004 |

OTHER PUBLICATIONS

European Search Report, Application No. 05112733, May 22, 2006, 6 pages.

* cited by examiner

*Primary Examiner*—Frantz B Jean
(74) *Attorney, Agent, or Firm*—Perkins Coie LLP

(57) ABSTRACT

A screen resolution information gathering and reporting system allows access to screen resolution information of attendees of a collaboration session. When attendees first join the collaboration session, each attendee's screen resolution information is gathered. The collected screen resolution information is then provided to the presenter of the collaboration session, for example, when the presenter joins the collaboration session or begins application sharing within the collaboration session.

16 Claims, 8 Drawing Sheets

SYSTEM AND METHOD FOR GATHERING AND REPORTING SCREEN RESOLUTIONS OF ATTENDEES OF A COLLABORATION SESSION

TECHNICAL FIELD

The described technology is directed generally to collaboration services and, more particularly, to improving an attendee's viewing experience during application sharing.

BACKGROUND

Today's global economy demands effective worldwide communication. For example, manufacturers often have suppliers located across the country and around the world. Timely and effective communication between the manufacturer and supplier can be critical to business success. In other cases, companies often assign business projects to work groups with members physically located around the world. In some situations, the work group members can belong to different organizations and/or companies. As with manufacturers and suppliers, timely and effective communication can be critical to the success of the work group.

Face-to-face meetings have been the traditional method of communicating, but, with the organizations becoming increasing geographically dispersed, these meetings often require travel on the part of attendees and, thus, are becoming increasingly time and cost prohibitive. With proliferation of computers and the advent of the Internet, and in particular, the maturing of the World Wide Web ("web"), these meetings are increasingly taking place virtually over computer networks through the use of electronic communication technologies, such as web meeting/conferencing and application sharing.

Application sharing technologies enable a sharing user, also referred to as a "presenter," to share an application with various viewing users, also referred to as "attendees" or "participants." The display produced by the application that is executing on the presenter's computer, and which is being shared, is made available via a connection, typically through a computer network, to the attendees' computers.

For example, when application sharing, the presenter of the application sharing session sends images of an area on the presenter's computer screen—i.e., the desktop—to all the other attendees of the meeting. The presenter may be able to designate what is to be shared with the attendees by, for example, electing to share the contents displayed on the entire screen, the contents displayed within a "sharing frame," which is a portion of the screen designated by the presenter using a pointing device such as a mouse, or the contents displayed by an application, typically in an application window. The attendees of the meeting see the shared images reconstructed on their own computers, and are able to see exactly what the presenter is seeing.

Even though electronic communication technologies provide many benefits, such as increased efficiency, there are, however, drawbacks with these technologies for application or image sharing. One drawback occurs when the presenter's computer and the attendees' computers are running at different screen resolutions, specifically when the presenter's computer is running at a higher screen resolution than an attendee's computer. In order to give the attendee full access to the entire higher resolution image on the attendee's lower resolution screen, the image is displayed using scroll bars on the attendee's computer. However, scroll bars may be difficult to use during a collaboration session, and the attendee will not be able to see the entire image at one time. Moreover, if the presenter performs an action, such as making an edit in a shared document, in the section of the image that is displayed on the presenter's computer screen but not displayed on the attendee's computer screen because of the lower resolution, the attendee will not be visually aware of the action taken by the presenter. Further, by the time the attendee manages to use the scroll bars to display the portion of the image in which the presenter performed the action, the presenter may have long completed the action.

Alternatively, the attendee's computer can scale the received higher resolution image to match the lower screen resolution running on the attendee's computer. For example, if the attendee's computer is currently running at 800×600 pixel screen resolution and the presenters computer is running at 1600×1200 pixel screen resolution, the attendee's computer can scale the received 1600×1200 pixel image down to an 800×600 pixel image to display the entire image without using scroll bars. A problem with scaling down the resolution of the image is the loss of detail. Depending on the difference in resolutions, a very large amount of detail may be lost. For example, the loss of detail may render a shared document illegible.

It would be desirable to have a technique that allows the presenter of an application or image sharing session to consider the resolutions of the attendees' computer screens in order to enhance the attendees viewing experience.

DETAILED DESCRIPTION

Figure 1:
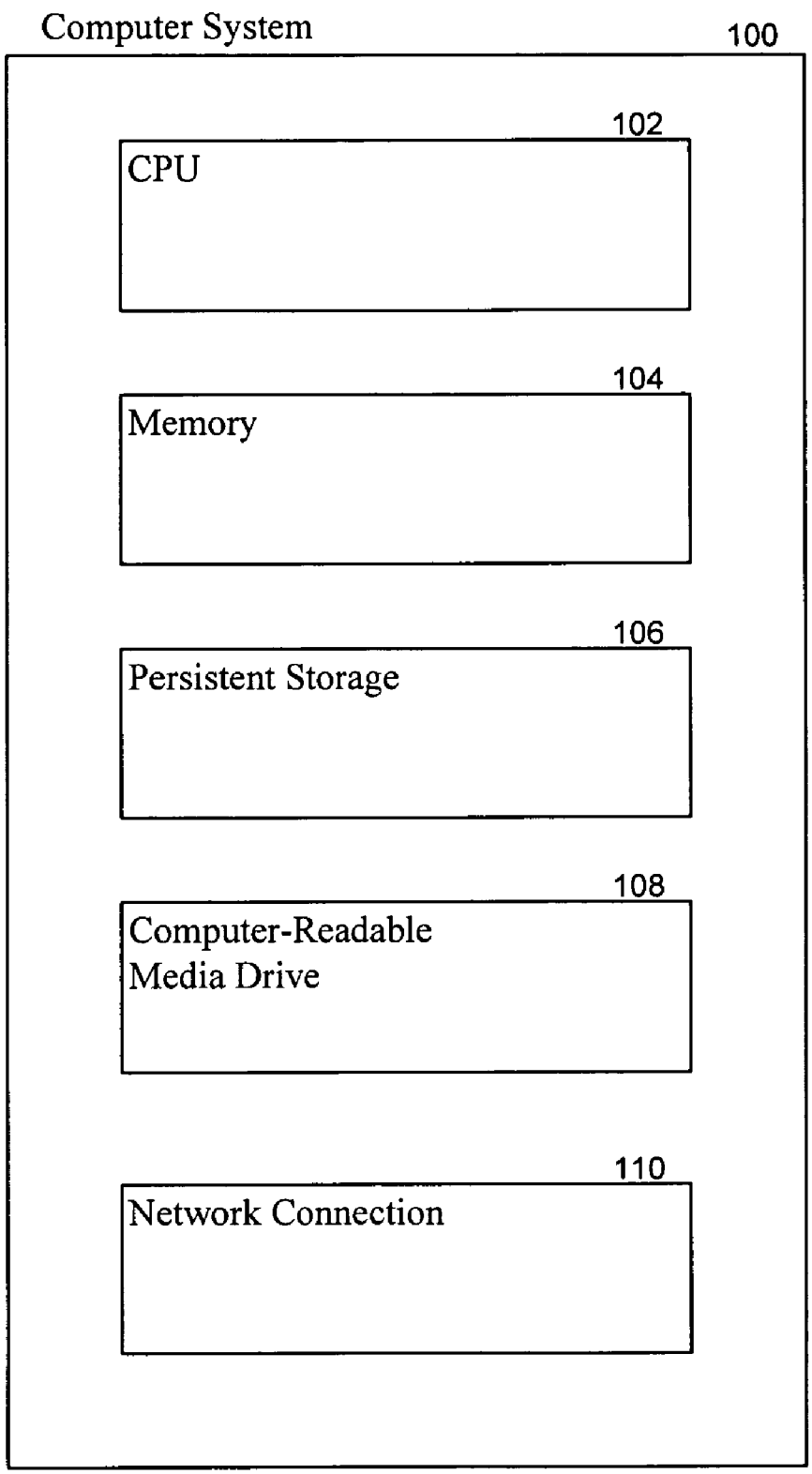
FIG. 1 is a block diagram illustrating selected components typically incorporated in at least some of the computer systems on which various embodiments of a screen resolution gathering and reporting system may be implemented.

A method and system for gathering and reporting screen resolution information of attendees of a collaboration session is provided. When attendees first join the collaboration session, each attendee's screen resolution information is gathered. The collected screen resolution information is then provided to the presenter of the collaboration session, for example, when the presenter joins the collaboration session or begins application sharing within the collaboration session. The presenter can then use the attendee screen resolution information to resize an object displayed on the presenter's computer screen, such as an application window or a sharing frame, so that a desired number of pixels of information are shared at one time.

In some embodiments, when an attendee joins a collaboration session, such as an online or web meeting, the attendee's screen resolution information is sent from the attendee's computer to a server that is providing—i.e., hosting—the collaboration service. For example, a process executing on the attendee's computer, such as a collaboration session client application, can send the screen resolution information to the server. The screen resolution information can be sent using any of a variety of well-known communication protocols.

When a presenter joins the collaboration session, the server sends the collected screen resolution information to the presenter's computer. When the presenter wants to share a sharing frame or an application window, the presenter can view the attendee screen resolution information and select one of the displayed resolutions. The application sharing program executing on the presenter's computer can then resize the sharing frame or application window according to the selected screen resolution. The presenter can request to view the attendee screen resolution information as needed. In one embodiment, the application sharing program executing on the presenter's computer can request from the server the attendee' screen resolution information when first invoked. In other embodiments, the server can send the collected screen resolution information when the presenter starts application sharing during the collaboration session.

In some embodiments, the server may periodically send the attendees' screen resolution information to the presenter's computer. For example, the server may send updated screen resolution information subsequent to a change in the collected screen resolution information. The change may be caused by one or more additional attendees joining the collaboration session—i.e., late arriving attendees—or one or more attendees leaving the collaboration session.

In some embodiments, the attendee screen resolution information is presented in aggregate form. For example, a window displayed on the presenter's computer screen may indicate the number of attendees at each reported screen resolution.

In some embodiments, the presenter's computer requests to receive the attendees' screen resolution information from the server. For example, the presenter can invoke a command or click on a displayed icon to cause the presenter's computer to request the attendees' screen resolution information from the server.

In some embodiments, the attendee's computer sends its screen resolution information directly to the presenter's computer. This may occur when a server is not involved or present and the attendees' computers communicate with the presenter computer during the collaboration session and/or the application sharing session without an intermediary server. For example, the collaboration service and/or the application sharing application may be executing on the presenter's computer.

In some embodiments, the presenter's computer uses the attendees' screen resolution information to assist the presenter resize the sharing frame or application window. For example, the application sharing program executing on the presenter's computer can provide a "snap" feature that assists the presenter resize or redraw the sharing frame or application window by snapping the sharing frame or application window to the closest predetermined resolution. The predetermined resolution may be the screen resolution previously selected by the presenter. The snap can occur when the sharing frame or application window is positioned within a predetermined number of pixels to the selected screen resolution.

The various embodiments of the method and system for gathering and reporting screen resolution information of attendees of a collaboration session, and their advantages are best understood by referring to FIGS. 1-8 of the drawings. The elements of the drawings are not necessarily to scale, emphasis instead being placed upon clearly illustrating the principles of the invention. Throughout the drawings, like numerals are used for like and corresponding parts of the various drawings.

FIG. 1 is a block diagram illustrating selected components typically incorporated in at least some of the computer systems on which various embodiments of a screen resolution gathering and reporting system may be implemented. These computer systems 100 may include one or more central processing units ("CPUs") 102 for executing computer programs; a computer memory 104 for storing programs and data—including data structures—while they are being used; a persistent storage device 106, such as a hard drive, for persistently storing programs and data; a computer-readable media drive 108, such as a CD-ROM drive, for reading programs and data stored on a computer-readable medium; and a network connection 110 for connecting the computer system to other computer systems, such as via the Internet, to exchange programs and/or data—including data structures. It will be appreciated that computer systems 100 may include one or more display devices for displaying program output, such as video monitors or LCD panels, and one or more input devices for receiving user input, such as keyboards, microphones, or pointing devices such as a mouse.

Embodiments of the screen resolution gathering and reporting system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The screen resolution gathering and reporting system may be described in the general context of computer-readable instructions, such as program modules, executed by computer systems 100 or other devices. Generally, program modules include routines, programs, objects, components, data structures, etc. that perform particular tasks or implement particular abstract data types. Memory 104 and persistent storage device 106 are computer-readable media that may contain instructions that implement the facility. It will be appreciated that memory 104 and persistent storage 106 may have various other contents in addition to the instructions that implement the screen resolution gathering and reporting system.

In the discussion that follows, various embodiments of the screen resolution gathering and reporting system are further described in conjunction with a variety of illustrative examples. It will be appreciated that the embodiments of the screen resolution gathering and reporting system may be used in circumstances that diverge significantly from these examples in various respects.

For example, even though various embodiments of the screen resolution gathering and reporting system are described in conjunction with application sharing within a collaboration session, the screen resolution gathering and reporting techniques are not to be limited to only application sharing sessions within a collaboration session. As such, one skilled in the art will appreciate that the described techniques can be adapted to work as a component of or in conjunction with various other applications which share information by causing images displayed on one computer screen to be reproduced on another computer screen. Moreover, the application sessions, including the application sharing session, may exist independent of the collaboration session.

Figure 2:
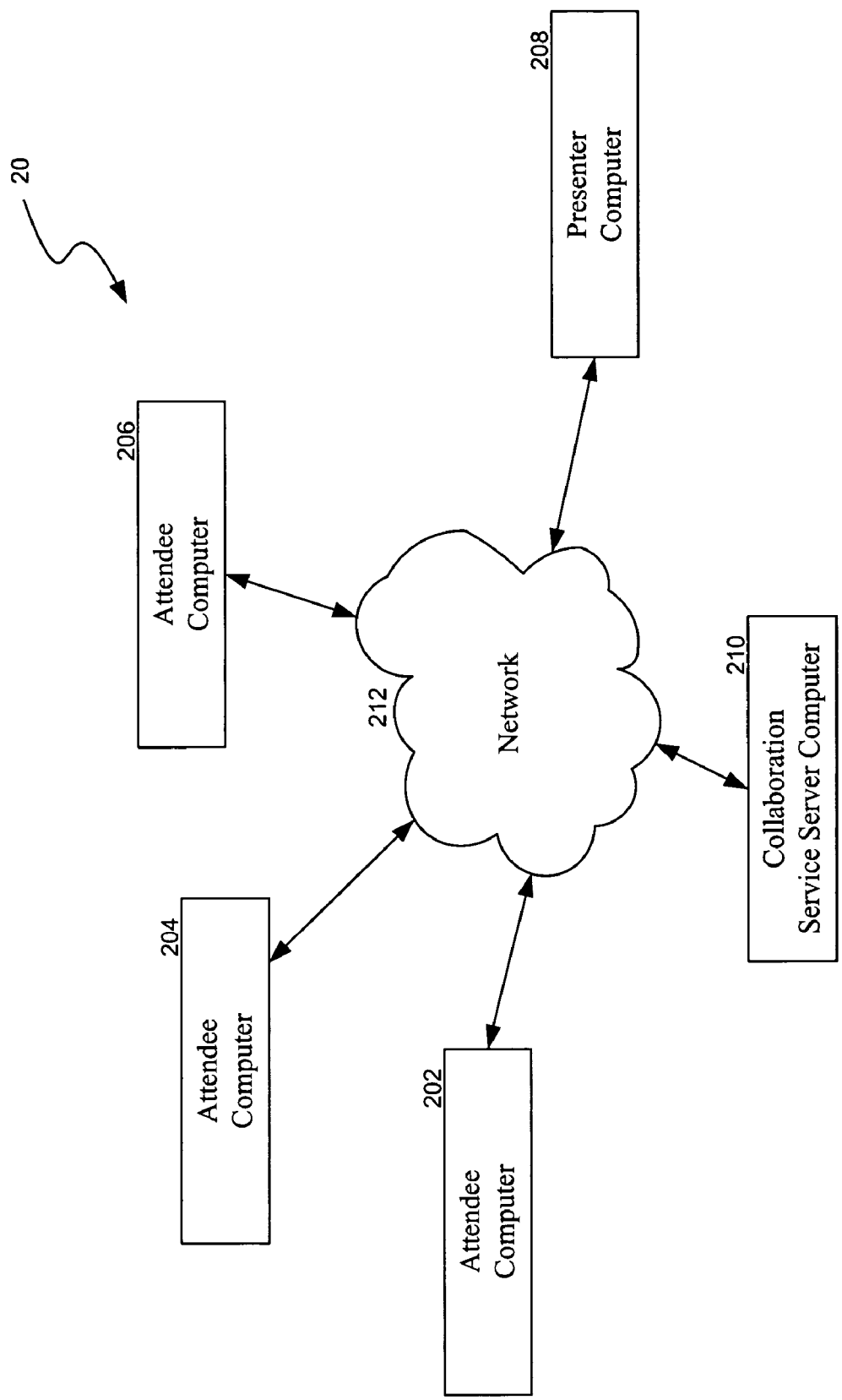
FIG. 2 is a high-level block diagram showing an environment in which the screen resolution gathering and reporting system may operate.

FIG. 2 is a high-level block diagram showing an environment 20 in which the screen resolution gathering and reporting system may operate. As depicted, environment 20 comprises one or more attendee computers illustrated, by way of example, as computers 202, 204, and 206, a presenter computer 208, and a collaboration service server computer 210. In particular, computers 202, 204, 206, 208, and 210 are each coupled to one another through a network 212. As used herein, the terms "connected," "coupled," or any variant thereof, means any connection or coupling, either direct or indirect, between two or more elements; the coupling of connection between the elements can be physical, logical, or a combination thereof.

Computers 202, 204, 206, 208, and 210 are as discussed above more generally with respect to FIG. 1. In particular, the attendee computer is used by a user to attend or participate in a collaboration session, the presenter computer is used by a user to host or present the collaboration session, and the collaboration service server computer provides the collaboration service, such as MICROSOFT LIVE MEETING, by "hosting" the collaboration session.

Network 212 is a communications link that facilitates the transfer of electronic content between, for example, the attached computers. In one embodiment, network 206 includes the Internet. It will be appreciated that network 212 may be comprised of one or more other types of networks, such as a local area network, a wide area network, a point-to-point dial-up connection, and the like.

Figure 3:
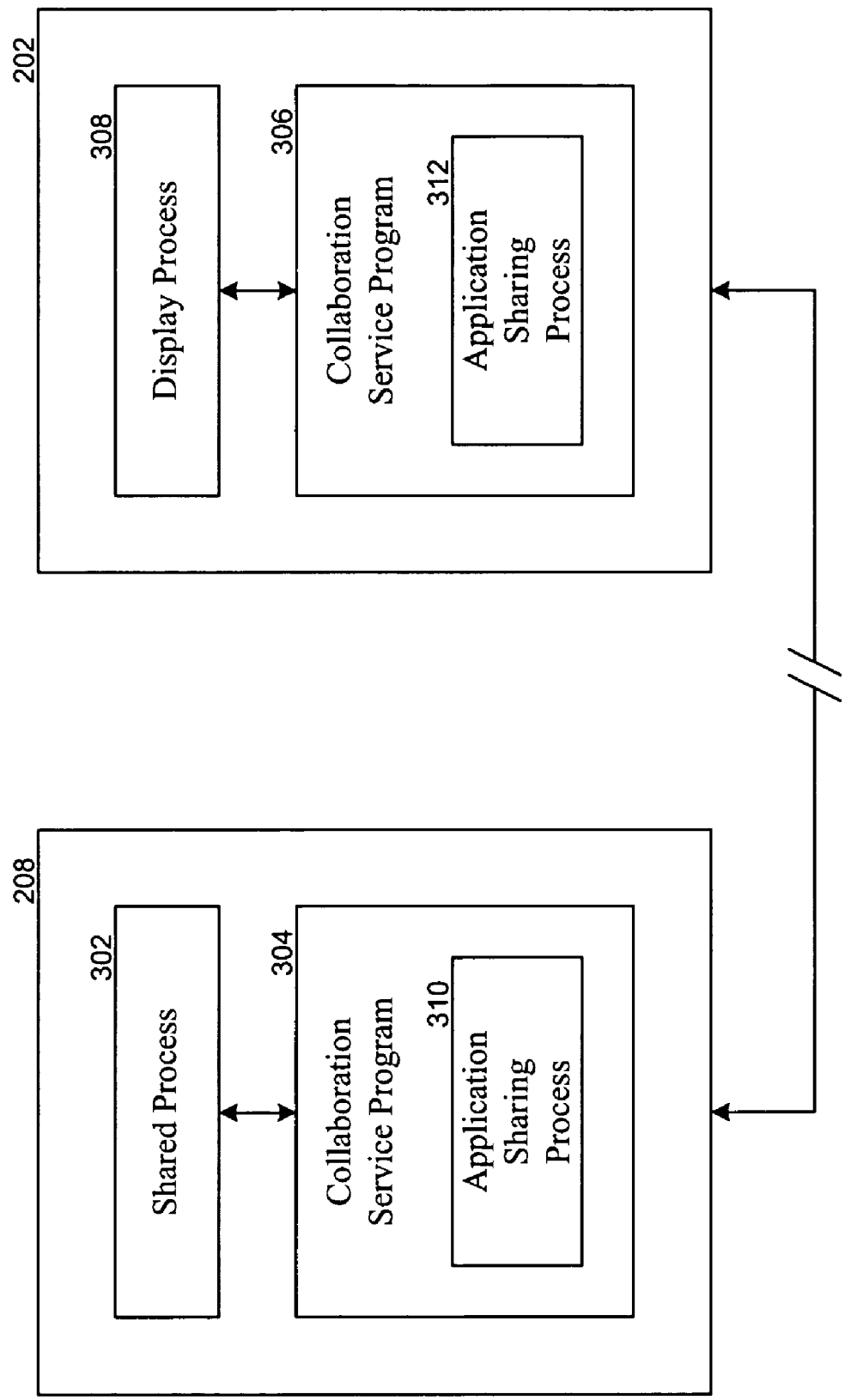
FIG. 3 is a block diagram illustrating selected components of a presenter computer coupled to an attendee computer, according to some embodiments.

FIG. 3 is a block diagram illustrating selected components of presenter computer 208 coupled to attendee computer 202, according to some embodiments. One skilled in the art will appreciate that although only one attendee computer is illustrated in FIG. 3, this is not meant as a limitation to the actual number of attendee computers and that there can be more than one attendee computer in an implementation of the system, as illustrated by way of FIG. 2. Even though the presenter computer is illustrated as being coupled to the attendee computer, one skilled in the art will appreciate that the presenter and attendee computers may communicate with one another through the collaboration service server computer, as illustrated in FIG. 2. Alternatively, in embodiments where the collaboration service server computer is not present, the presenter and attendee computers may communicate directly with one another. In these embodiments, the collaboration service may be provided by the presenter computer.

As depicted, the presenter computer comprises one or more shared processes 302 and a collaboration service program 304, each of which is executing on the presenter computer. The collaboration service program on the presenter computer comprises an application sharing process 310. The attendee computer comprises a collaboration service program 306 and a display process 308, each of which is executing on the attendee computer. The collaboration service program on the attendee computer comprises an application sharing process 312. The aforementioned components and processes of the presenter computer and the attendee computer are only illustrative, and one skilled in the art will appreciate that the computers may include other components and processes not depicted.

The shared processes include processes, such as word processing programs, from which information is being shared with one or more computers, such as the attendee computer. One skilled in the art will appreciate that the information generated by the shared processes need not be shared completely. That is, the information shared by the presenter may be a subset of the information generated by a shared process. Moreover, many shared processes can also be used in a non-shared manner. For example, a word processing program may be used by the presenter for non-collaborative document production, and may then be used in a shared manner for group editing of the same or another document.

The collaboration service program allows the presenter to register with the collaboration service and to conduct the collaboration session. During the collaboration session, the presenter can initiate an application sharing session, for example, by selecting an icon in a user interface generated by the collaboration service program and displayed on the presenter computer's screen. This causes the application sharing process to start executing on the presenter computer, for example, as part of the collaboration service program. The application sharing process on the presenter computer may present the presenter a list of sharable applications on the presenter computer. The presenter may select the applications and/or documents to share in the application sharing session. Alternatively, the presenter may elect to specify a sharing frame, and share the information displayed within the sharing frame.

The application sharing process on the presenter computer is coupled to a counterpart application sharing process on the attendee computer. For example, the application sharing processes may be coupled via the network as depicted in FIG. 2, and the networking communications functionality may be provided by the collaboration service programs on the respective computers. Further, the application sharing process may transmit the shared information to the collaboration service server computer, which then transmits the shared information to each of the attendee computers.

Figure 4:
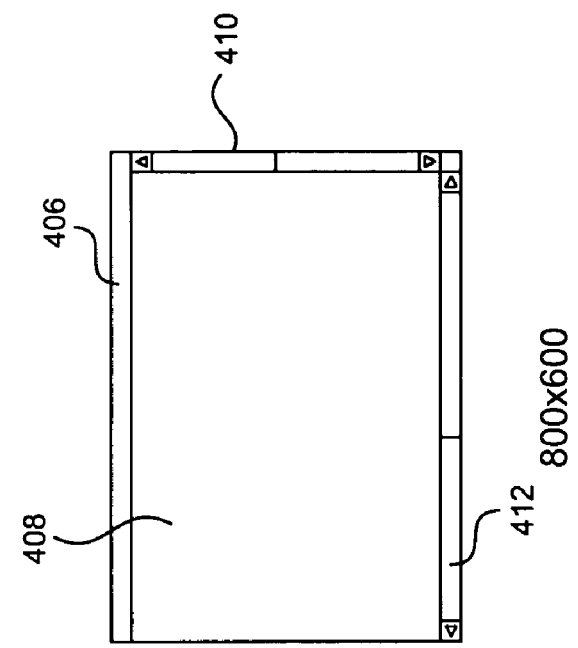
FIG. 4 is a display diagram illustrating a sample shared window on a presenter computer and a sample display window on an attendee computer.
Figure 4:
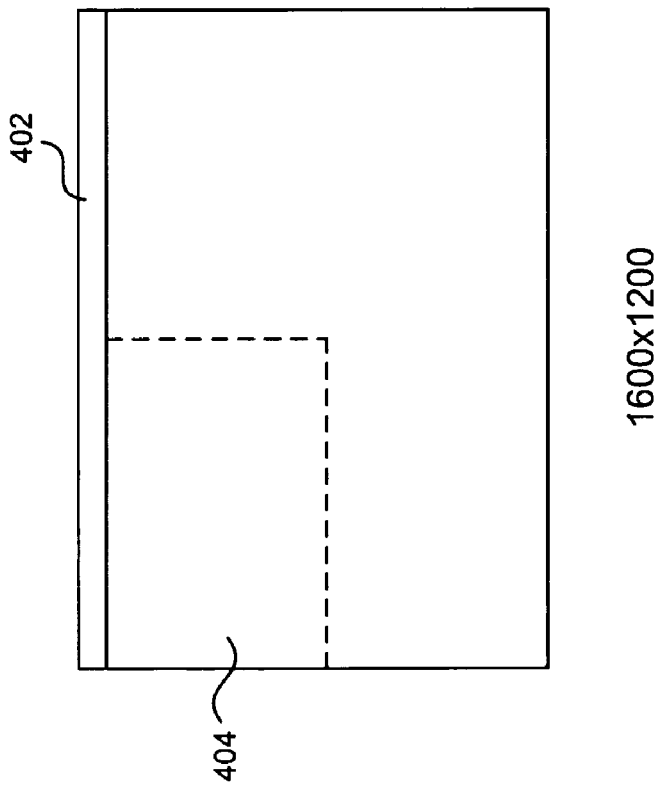

FIG. 4 is a display diagram illustrating a sample shared window on a presenter computer and a sample display window on an attendee computer. A shared window 402 may be a shared application window or a sharing frame displayed on the presenter computer. The information that is displayed in the shared window is shared with each of the attendees during an application sharing session. As depicted, the shared window on the presenter computer displays contents at a resolution of 1600×1200 pixels.

A display window 406 is displayed on the attendee computer and displays the information that is shared by the presenter during the application sharing session. As depicted, the display window on the attendee computer displays contents at a resolution of 800×600 pixels. To account for the lower screen resolution, the display window utilizes a vertical scroll bar 410 and a horizontal scroll bar 412 in order to display the shared information—i.e., the shared image at the higher 1600×1200 pixel resolution. As such, view area 408 may display the information displayed in quadrant 404 in the shared window displayed on the presenter computer. The attendee or other user can use the scroll bars provided with the display window in order to display in the view area of the display window the information that appears outside quadrant 404 in the shared window.

Figure 5:
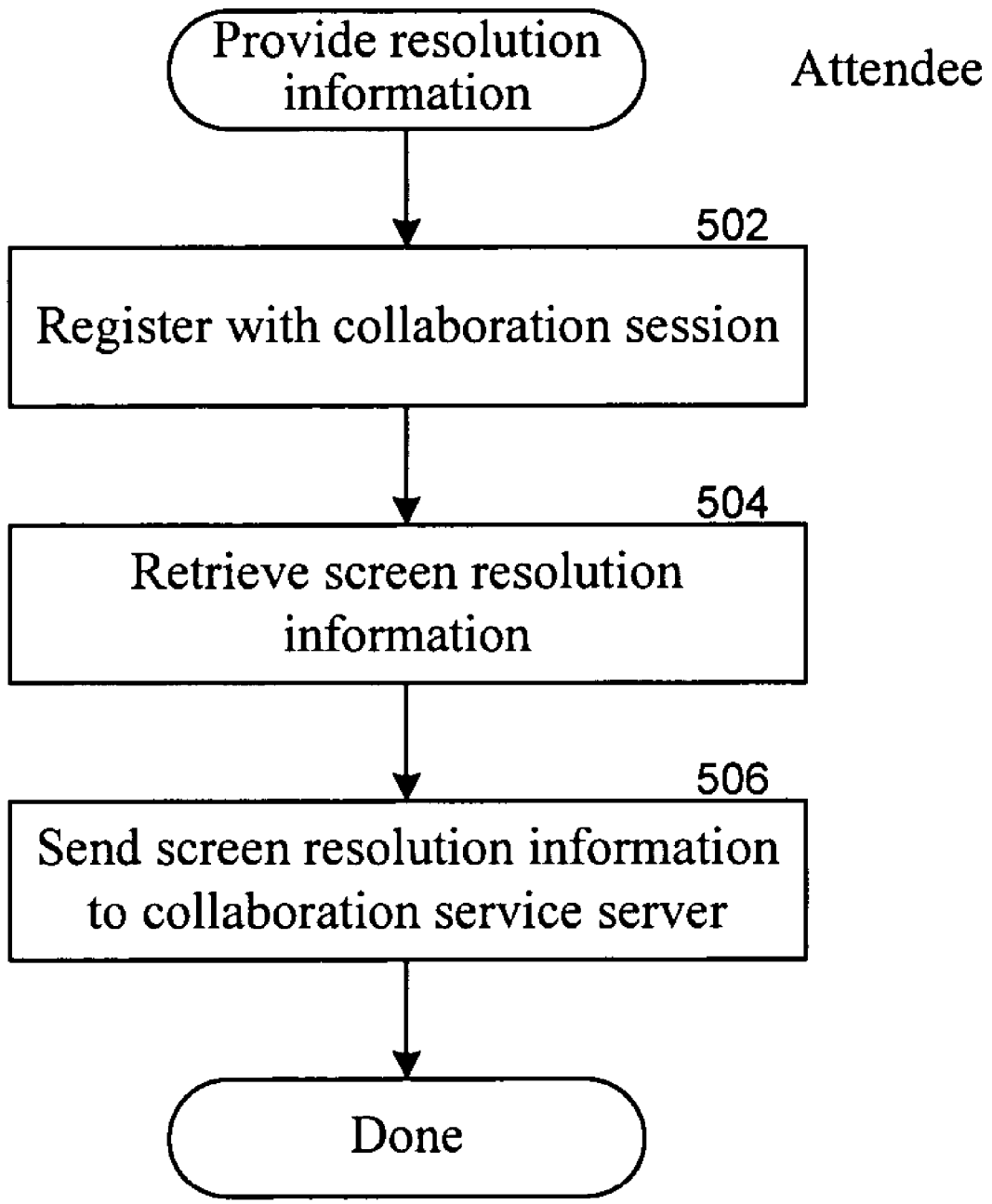
FIG. 5 is a flow diagram illustrating the gathering of screen resolution information for attendee computers, according to one embodiment.

FIG. 5 is a flow diagram illustrating the gathering of screen resolution information for attendee computers, according to one embodiment. The attendee computer provides its screen resolution information to the collaboration service server. At step 502, a user—i.e., attendee—executes a process, such as a collaboration service program on the attendee computer, and connects to and registers with a collaboration session provided by a collaboration service server computer. At step 504, the collaboration service program, or other process on the attendee computer, retrieves the screen resolution information of the attendee computer display device. At step 504, the collaboration service program sends the screen resolution information to the collaboration service server. The collaboration service program can retrieve and send its screen resolution information subsequent to or as part of a successful registration process.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps without detracting from the essence of the invention.

Figure 6:
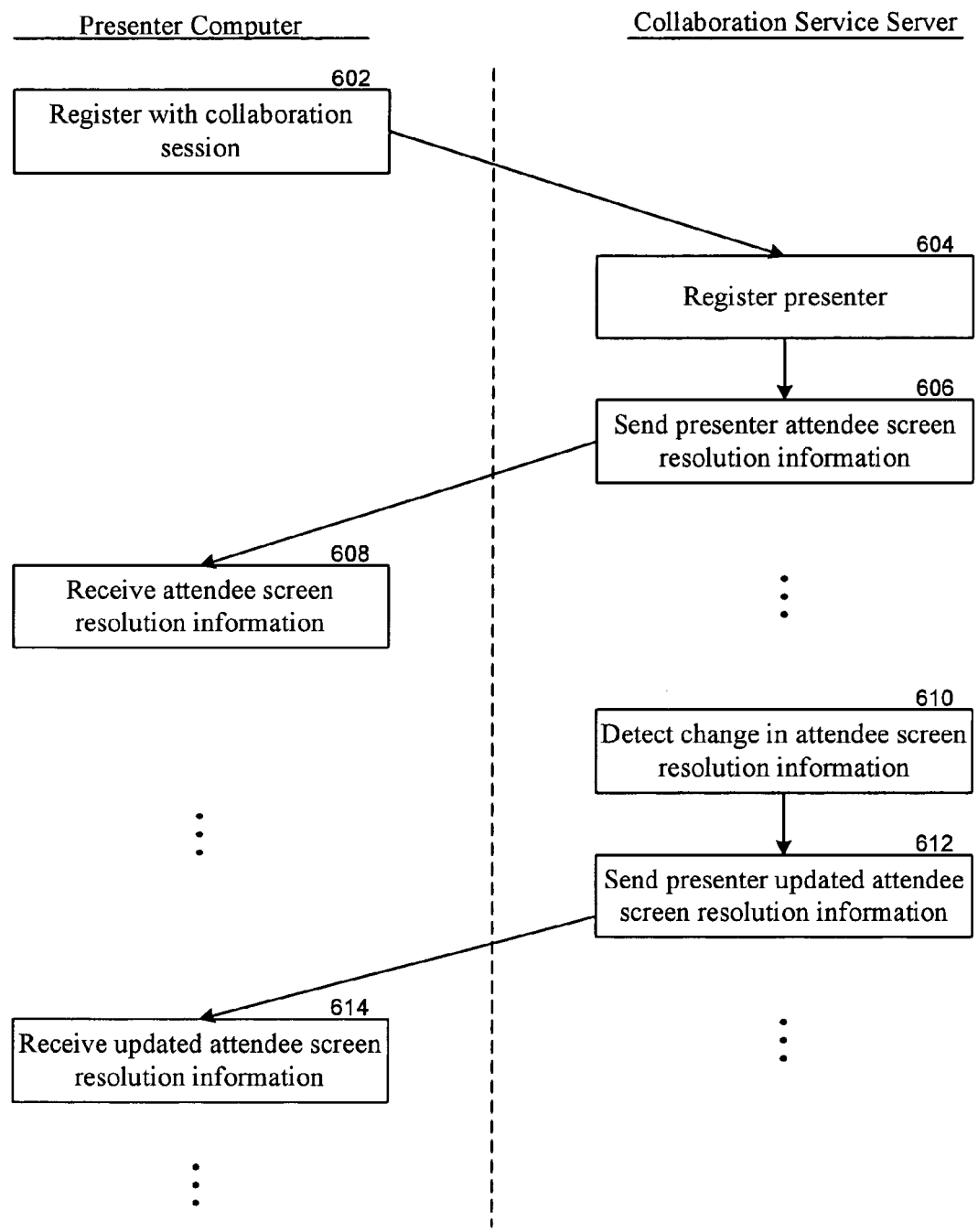
FIG. 6 is a diagram illustrating an example flow of information between a presenter computer and a collaboration service server, according to one embodiment.

FIG. 6 is a diagram illustrating an example flow of information between a presenter computer and a collaboration service server, according to one embodiment. The collaboration service server provides the gathered attendee computer screen resolutions to the presenter computer. At step 602, a user—i.e., the presenter—executes a process, such as a collaboration service program, on the presenter computer, and connects to and registers with a collaboration session provided by a collaboration service server computer. At step 604, a process on the collaboration service server registers the presenter with the collaboration session. At step 606, the collaboration service server sends the attendee screen resolution information to the presenter computer. At step 608, the collaboration service program on the presenter computer receives and stores the attendee screen resolution information.

In one embodiment, the collaboration service server sends the screen resolution information in aggregate. For example, assuming that three attendees, AttendeeA, AttendeeB, and AttendeeC, reported screen resolutions of 1600×1200 pixels, and two attendees, AttendeeD and AttendeeE, reported screen resolutions of 1024×768 pixels, and one attendee, AttendeeF, reported a screen resolution of 800×600 pixels, the collaboration service server may send the screen resolution information in aggregate as follows:

3 attendees at 1600×1200
2 attendees at 1024×768
1 attendee at 800×600

In other embodiments, the collaboration service server may include information regarding the registered attendees, such as the identity of the attendees, with the aggregate screen resolution information. In still other embodiments, the collaboration service server may individually list the screen resolution information for each registered attendee.

Subsequently, at step 610, the collaboration service server detects a change in the attendee screen resolution information. The change in the attendees' screen resolution information may be caused by, for example, another attendee registering and providing its screen resolution, a previously registered attendee leaving the collaboration session, a previously registered attendee changing its screen resolution information, and the like. At step 612, the collaboration service server sends the updated attendee screen resolution information to the presenter computer. At step 614, the collaboration service program on the presenter computer receives and stores the updated attendee screen resolution information.

Figure 7:
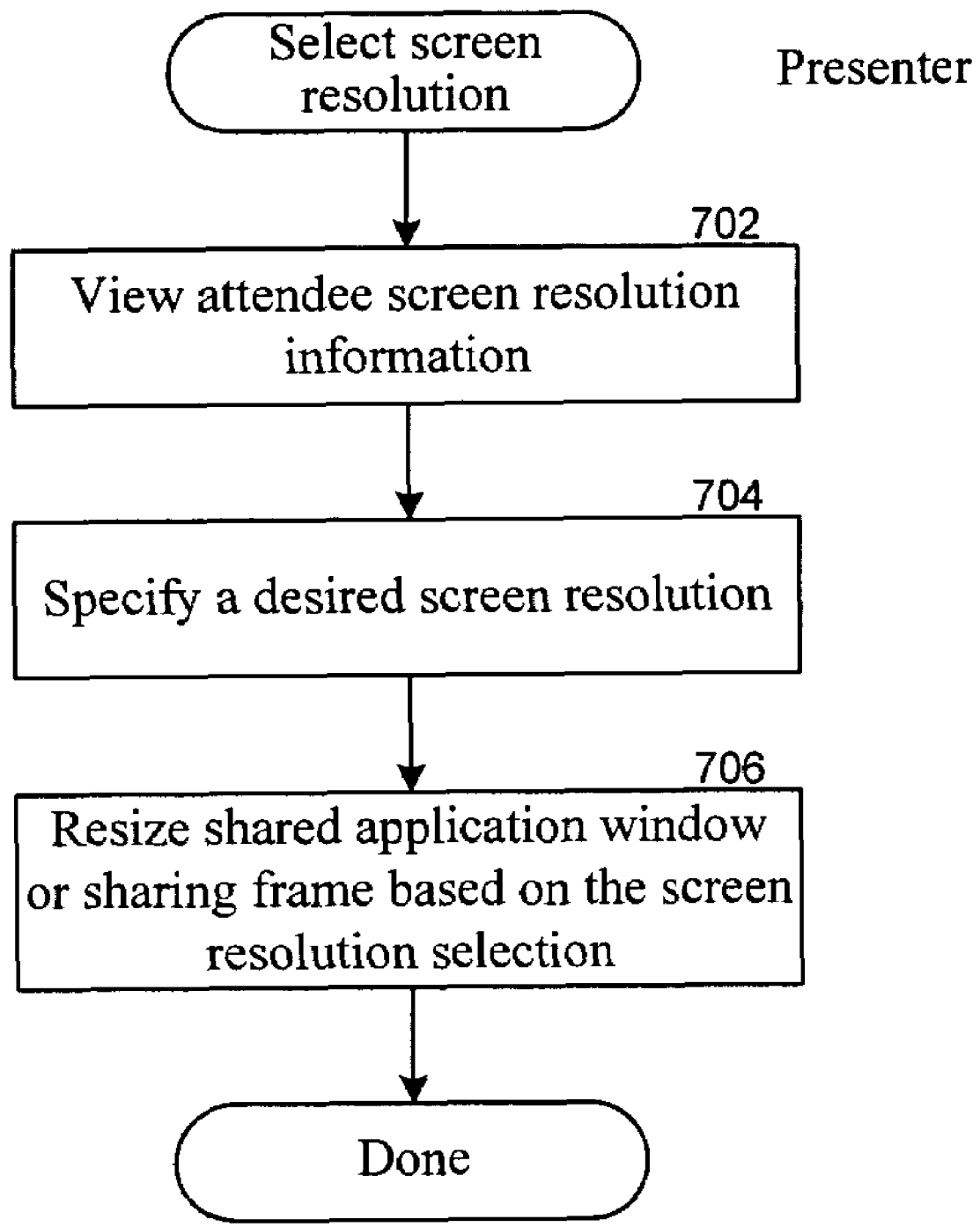
FIG. 7 is a flow diagram illustrating the selection of a screen resolution on the presenter computer, according to one embodiment.

FIG. 7 is a flow diagram illustrating the selection of a screen resolution on the presenter computer, according to one embodiment. In one embodiment, a collaboration session user interface displayed on the presenter computer screen provides an icon to instantiate a dialog through which the presenter can view the attendee screen resolutions, select one of the displayed screen resolutions or provide a different screen resolution as a desired resolution, and resize the shared application window or sharing frame to match the desired resolution.

At step 702, the presenter views the attendees' screen resolution information, for example, displayed in a dialog window. At step 704, the presenter specifies a desired screen resolution by, for example, selecting one of the displayed screen resolutions from the dialog window. At step 706, the presenter submits a command to resize the shared application window or the sharing frame, which causes the collaboration service program on the presenter computer to resize the shared application window or the sharing frame based on the desired screen resolution.

One skilled in the art will appreciate that the presenter can display the attendees' screen resolution information and select a desired screen resolution at any time during the collaboration session. Moreover, the presenter can display the attendees' screen resolution information and/or select the desired screen resolution a multiple number of times, for example, during the collaboration session. For example, subsequent to receiving updated attendee screen resolution information from the collaboration service server, the collaboration service program on the presenter computer can provide an indication, such as a visual indication on the user interface provided by the collaboration service program, to the presenter of the updated attendees' screen resolution information. The presenter can then cause the display of the updated attendees' screen resolution information.

Figure 8:
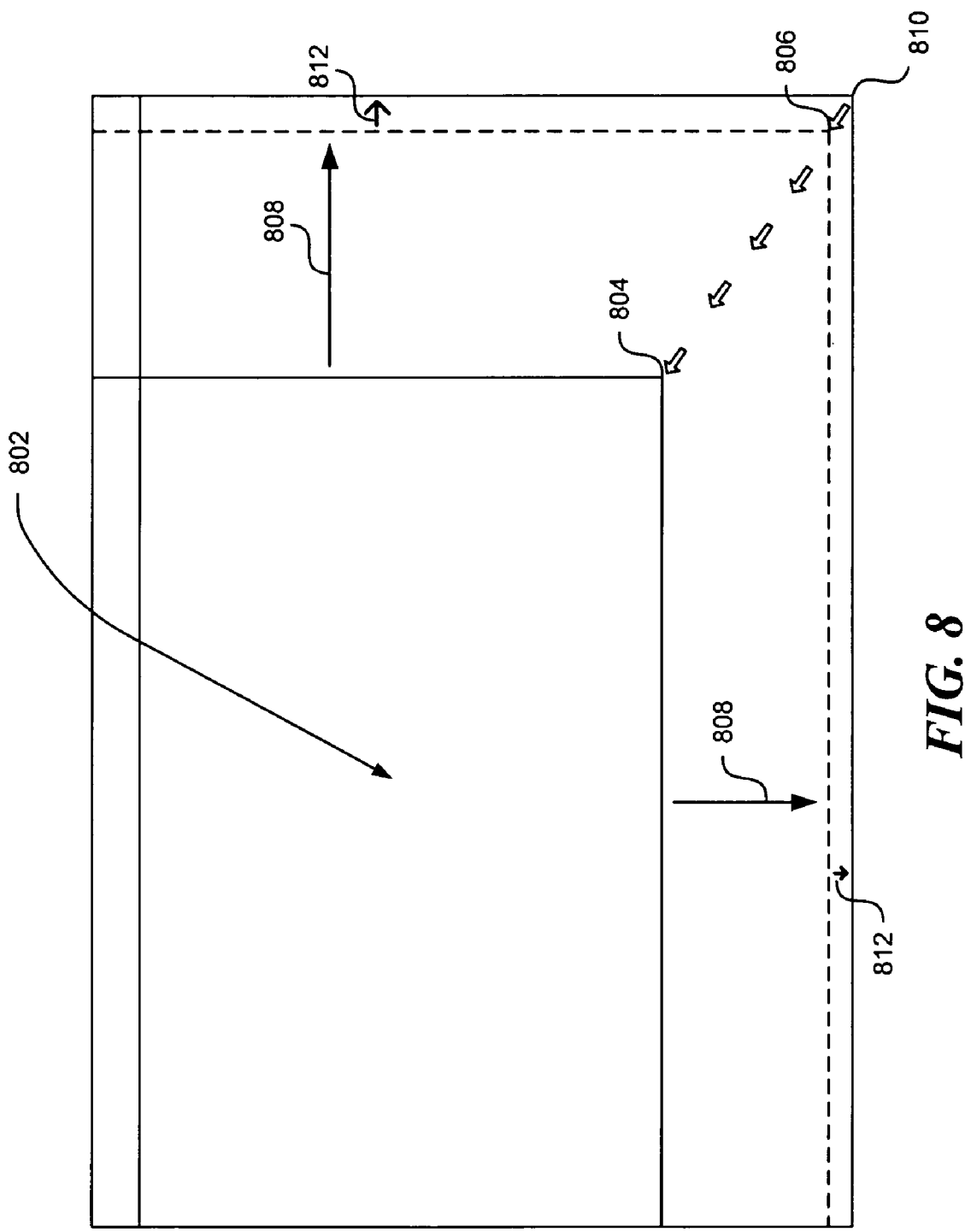
FIG. 8 is a display diagram illustrating the operation of the snap feature.

FIG. 8 is a display diagram illustrating the operation of the snap feature. A display window 802 may be a shared application window or a sharing frame displayed on the presenter computer screen. The presenter or other user may want to resize—i.e., enlarge—the display window. To enlarge the display window, the presenter positions a pointing device, such as a mouse, and selects the bottom right corner of the display window by, for example, clicking on the left mouse button, and drags the corner from a point 804 to a point 806. The opposite corner of the display window—i.e., the top left corner—remains anchored throughout the dragging and resizing process. This causes the bottom and right side of the display window to move outward to create a larger display window, as illustrated by movement arrows 808.

Having dragged the corner of the display window from point 804 to point 806, the presenter releases the left mouse button to cause the display window to resize. In response, the collaboration service program on the presenter computer can check to determine if the current size of the display window is within a predetermined number of pixels to the screen resolution specified by the presenter—i.e., the presenter's desired screen resolution. If the current size of the display window is within the predetermined number of pixels of the screen resolution specified by the presenter, the collaboration service program can snap the display window to the desired screen resolution. For example, as depicted in FIG. 8, the collaboration service program can snap the display window to the desired screen resolution by repositioning the bottom right corner of the display window from point 806 to a point 810, which causes the bottom and right side of the display window to move outward to snap to the desired screen resolution, as illustrated by movement arrows 812. In one embodiment, the size of the display window is provided as a tooltip to aid the presenter in determining the appropriate size. In other embodiments, the collaboration service program can snap the display window to typical screen resolutions and/or attendees' screen resolutions causing the display window to snap to various sizes and not just one resolution.

From the foregoing, it will be appreciated that embodiments of the invention have been described herein for purposes of illustration, but that various modifications may be made without deviating from the spirit and scope of the invention. Accordingly, the invention is not limited except in accordance with elements explicitly recited in the appended claims.

We claim:

1. A computer-readable storage medium whose contents cause a presenter's computer of a presenter of a collaboration session to:
   register the presenter with the collaboration session;
   responsive to the presenter registering with the collaboration session, receive by the presenter's computer at least one screen resolution information for an attendee of the collaboration session, wherein the screen resolution information is a first resolution of a computer screen of the attendee's computer;
   display on a computer screen of the presenter's computer a shared frame of the collaboration session, the shared frame having a second resolution that is a higher resolution than the first resolution;
   display on the computer screen of the presenter's computer an indication of the first resolution of the computer screen of the attendee's computer;
   receive from the presenter a selection of the first resolution of the computer screen of the attendee's computer; and
   in response to receiving a selection of the first resolution, resize the shared frame being displayed on the computer screen of the presenter's computer to have the first resolution;
   so that when the resized shared frame is displayed on the computer screen of the attendee's computer, the entire shared frame fits onto the computer screen of the attendee's computer.

2. The computer-readable storage medium of claim 1, wherein the screen resolution information is received from a computer hosting the collaboration session.

3. The computer-readable storage medium of claim 1, wherein the screen resolution information is sent by the attendee's computer subsequent to the attendee registering with the collaboration service.

4. The computer-readable storage medium of claim 1, wherein the screen resolution information is displayed in aggregate.

5. The computer-readable storage medium of claim 1 whose contents further cause the presenter's computer to transmit a request to receive the screen resolution information, and wherein the screen resolution information is received in response to the request to receive the screen resolution information.

6. The computer-readable storage medium of claim 1 whose contents further cause the presenter's computer to:
   detect a resizing by the presenter of the shared frame being displayed on the computer screen of the presenter's computer; and
   snap the shared frame to the first resolution in response to the shared frame being within a predetermined number of pixels of the first screen resolution.

7. A method in a first computer system for gathering and reporting screen resolutions of attendees of a collaboration session, the method comprising:
   providing at the first computer system the collaboration session, the first computer system having a first screen resolution;
   receiving from a second computer system of an attendee of the collaboration session a second screen resolution of the second computer system; and
   sending from the first computer system to a third computer system of a presenter of the collaboration session the first screen resolution of the first computer system and the second screen resolution of the second computer system, wherein the third computer system shares a shared window in the collaboration session, the shared window having a third screen resolution
   wherein the third computer system displays to the presenter an indication of the first screen resolution and the second screen resolution, and upon selection by the presenter of one of the first screen resolution or the second screen resolution, resizes a shared window being displayed on a computer screen of the third computer system to have the selected first screen resolution or second screen resolution
   so that when the resized shared window is displayed on a computer screen of the computer system with the selected first screen resolution or second screen resolution, the entire shared window fits onto that computer screen.

8. The method of claim 7, wherein the second screen resolution is received when the attendee joins the collaboration session.

9. The method of claim 7, wherein the first computer system and the second computer system are the same computer system.

10. The method of claim 7 further comprising periodically sending from the first computer system to the third computer system the second screen resolution of the second computer system.

11. The method of claim 10, wherein the first screen resolution and the second screen resolution are sent from the first computer system to the third computer system prior to sharing of the shared window during the collaboration session.

12. The method of claim 7 further comprising:
   receiving from a fourth computer system of a second attendee of the collaboration session a fourth screen resolution of the fourth computer system; and
   sending from the first computer system to the third computer system the fourth screen resolution of the fourth computer system.

13. A presenter's computer through which a presenter of a collaboration session selects a screen resolution for the collaboration session, comprising:
   a component that receives at the presenter's computer a plurality of screen resolutions of computer screens of attendee computers;
   a component that displays on a computer screen of the presenter's computer a shared frame of the collaboration session, the shared frame having a presenter resolution that is different from a received screen resolution;
   a component that displays on the computer screen of the presenter's computer an indication of a received screen resolution of the computer screen;
   a component that receives from the presenter a selection of a received screen resolution by selecting a displayed indication of a received screen resolution; and
   a component that, in response to receiving a selection of a received screen resolution, resizes the shared frame being displayed on the computer screen of the presenter's computer to have a resolution corresponding to the selected screen resolution;

so that when the resized shared frame is displayed on the computer screen of the attendee's computer with the selected screen resolution, the entire shared frame fits onto the computer screen of that attendee's computer wherein the components are implemented as computer-executable instruction that are executed by the presenters computer.

14. The presenter's computer of claim 13 wherein the screen resolutions are received from a computer hosting the collaboration session.

15. The presenter's computer of claim 13, wherein the screen resolution is sent by an attendee's computer subsequent to the attendee registering with the collaboration service.

16. The presenters computer of claim 13 wherein the presenter's computer transmits a request to receive the screen resolutions, and wherein the screen resolutions are received in response to the request to receive the screen resolutions.

* * * * *

UNITED STATES PATENT AND TRADEMARK OFFICE
CERTIFICATE OF CORRECTION

| | | |
|---|---|---|
| PATENT NO. | : 7,599,989 B2 | Page 1 of 1 |
| APPLICATION NO. | : 11/042320 | |
| DATED | : October 6, 2009 | |
| INVENTOR(S) | : Stevens et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1271 days.

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,599,989 B2 | Page 1 of 1 |
| APPLICATION NO. | : 11/042320 | |
| DATED | : October 6, 2009 | |
| INVENTOR(S) | : Jeremy Max Stevens et al. | |

It is certified that error appears in the above-identified patent and that said Letters Patent is hereby corrected as shown below:

In column 11, lines 9-10, in Claim 13, delete "presenters" and insert -- presenter's --, therefor.

In column 12, line 7, in Claim 16, delete "presenters" and insert -- presenter's --, therefor.

Signed and Sealed this

Fifteenth Day of February, 2011

David J. Kappos
*Director of the United States Patent and Trademark Office*